June 17, 1969  D. E. HEUTZENROEDER  3,450,151
ABRASION AND CORROSION RESISTANT VALVE CONSTRUCTION AND METHOD
Filed July 28, 1966  Sheet 1 of 2

INVENTOR.
DALE E. HEUTZENROEDER
BY
*Wm. H. Dean*

INVENTOR.
DALE E. HEUTZENROEDER

United States Patent Office 3,450,151
Patented June 17, 1969

3,450,151
ABRASION AND CORROSION RESISTANT VALVE CONSTRUCTION AND METHOD
Dale E. Heutzenroeder, 606 Solana Drive,
Tempe, Ariz. 85281
Filed July 28, 1966, Ser. No. 568,539
Int. Cl. F16k 51/00, 5/00
U.S. Cl. 137—375         2 Claims

ABSTRACT OF THE DISCLOSURE

An abrasion and corrosion resistant valve having a valve body and a valve member movably mounted therein, the valve body having inlet and outlet openings adapted to align with a bore portion of the valve body which is movable into and out of register with the openings in the valve body, and abrasion and corrosion resistant material in the form of a coating surrounding said valve member and lining the bores of said inlet and outlet openings of said valve body.

---

This invention relates to an abrasion and corrosion resistant valve construction and method.

Valves such as used in the mining industry to handle the flow of tailings or other materials which are both abrasive and corrosive, have been difficult to maintain and, consequently, a great expense from a maintenance standpoint.

Such valves having flow passages for conducting corrosive and abrasive materials and which are made of ordinary metal, such as iron or other conventional materials, are quickly eroded and corroded to such an extent, that holes are formed in the valve bodies and in the valve members, so as to render them inoperative, either because of leakage or the inability to shut off flow through the valve, when desired. Additionally, many conventional valves, when subjected to the foregoing conditions, are very difficult to operate, since the corrosion and erosion factors tend to bind the metal to metal relatively movable valve parts and, consequently, such valves become, in some instances, very difficult to open or close.

Accordingly, it is an object of the present invention to provide an abrasion and corrosion resistant valve construction, in which a valve body is provided with a movable valve member having an abrasion and corrosion resistant covering which rotates in the valve body and which is contacted by corrosion and abrasion resistant sleeves adjacent the inlet and outlet of the valve and wherein the valve member covering and sleeves are of resilient or yieldable rubber-like material, all of which provides for corrosion and abrasion resistance of the valve, as well as continued ease of operation in the opening and closing of the valve.

Another object of the invention is to provide a novel abrasion and corrosion resistant valve, wherein a substantially spherical valve member is provided with a bore extending to the center thereof and in which the walls of the bore and the periphery of the valve member are covered with a corrosion and abrasion resistant rubber-like material which is engaged by inlet and outlet sleeves which surround the inlet and outlet portions of the valve and bear upon the spherical surfaces of the coating on the valve member in such a manner that the sleeves, as well as the coating on the valve member, may be deflected into intimate contact with each other by pressure of fluid passing therethrough and whereby the corrosion and abrasion resistant character of the materials maintain them in soft pliable smooth condition for relative movement of the valve member with respect to the sleeves at all times.

Another object of the invention is to provide a novel valve construction, wherein a valve member is relatively rotatable in a valve housing and wherein the housing is constructed of an intermediate cylindrical section and a pair of end sections secured at opposite ends thereof by bolts and wherein resilient sleeves surround the inlet and outlet of the valves and have radially directed flanges clamped between the end sections and the intermediate or body section of the housing so as to hold the sleeves in position to be contacted by external surfaces of a valve member, said external surfaces being formed by a resilient coating surrounding the relatively movable valve member which comprises a generally spherical shape having a central bore extending therethrough and rotatable into and out of alignment with the inlet and outlet portions of the valve around which said sleeves are disposed.

Another object of the invention is to provide a novel method for construction of a spherical abrasion and corrosion resistant valve member.

Further objects and advantages of the present invention may be apparent from the following specification, appended claims and accompanying drawings, in which:

Figure 1:
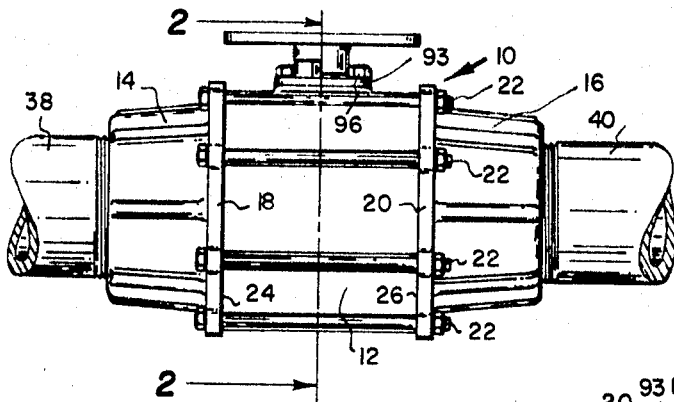
FIG. 1 is a side elevational view of an abrasion and corrosion resistant valve construction of the present invention, showing fragmentarily a pair of conduits connected to the inlet and outlet portions of the valve.
Figure 2:
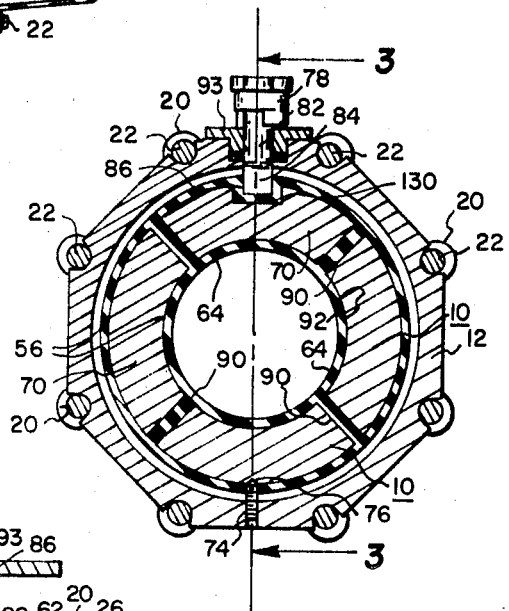
FIG. 2 is an enlarged cross-sectional view of the valve construction of the invention, taken from the line 2—2 of FIG. 1.
Figure 3:
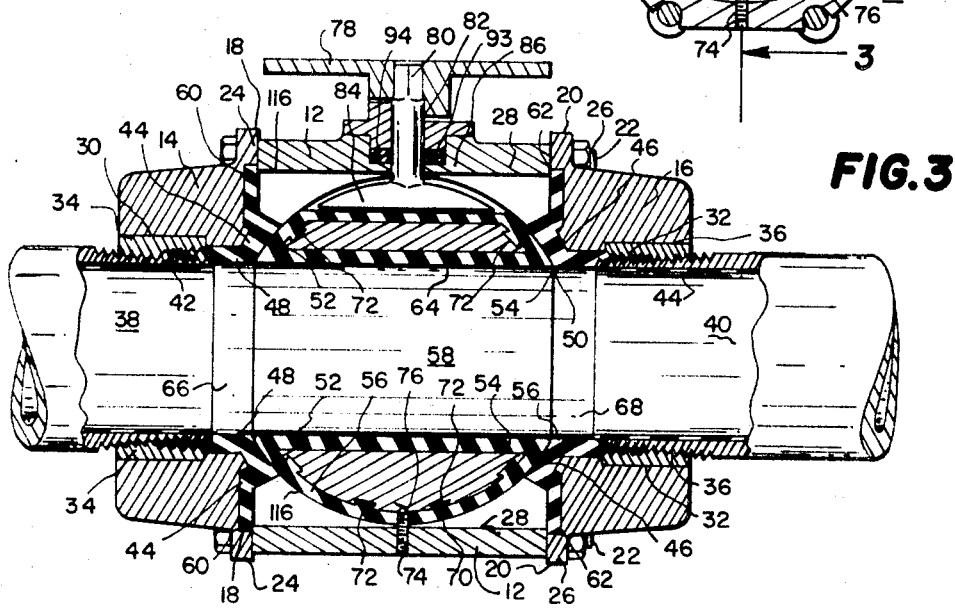
FIG. 3 is a longitudinal sectional view of the valve construction of the invention, taken from the line 3—3 of FIG. 2, showing fragmentary portions of conduits in connection with the inlet and outlet portions of the valve of the invention.

As shown in FIGS. 1, 2 and 3 of the drawings, the valve construction of the invention comprises a housing 10 composed of a generally hollow cylindrical middle or intermediate housing section 12 and a pair of end housing sections 14 and 16. These end sections 14 and 16 are provided with respective flanges 18 and 20 through which bolts 22 extend. These bolts clamp the flanges 18 and 20 against opposite ends 24 and 26 of the housing section 12.

The housing 12 is a hollow cylindrical housing having an inner annular wall 28 and the end housing 14 and 16 are provided with internal annular walls 30 and 32, respectively, in which are disposed internally screw threaded hollow sleeves 34 and 36, respectively. These internally screw threaded sleeves 34 and 36 are adapted to receive externally screw threaded pipe or conduit members 38 and 40. These conduit members 38 and 40 are provided with respective external screw threads 42 and 44, which engage the internal screw threads of the sleeves or bushings or 34 and 36.

Abrasion and corrosion resistant sleeves 44 and 46 are provided with cylindrical sleeve portions 48 and 50 which are annular and which are each provided with a portion over lapping respective threads of the internally screw threaded bushings 34 and 36 so that when the external threads 42 and 44 of the conduit sections and 38 and 40 are screwed into the bushings 34 and 36, that said external nal screw threads 42 and 44 will engage and thread into the ends of the cylindrical portions 48 and 50 which overlie the internal screw threads of the bushings 34 and 36 and, thus sealingly engage the cylindrical portions 48 and 50 of the sleeves 44 and 46. The sleeves 44 and 46 being made of corrosion resistant material are generally of plastic or rubber-like material and these sleeves 44 and 46 are provided with inwardly directed spheroid surfaces 52 and 54, respectively, which engage corresponding peripheral portions of an abrasion and corrosion resistance covering 56 on a ball valve member 58, as will be hereinafter described.

The sleeves 44 and 46 are provided with respective radial extending flange portions 60 and 62 which are clamped between the flanges 18 and 20 and the opposite ends 24 and 26 of the intermediate housing member 12.

Figure 4:
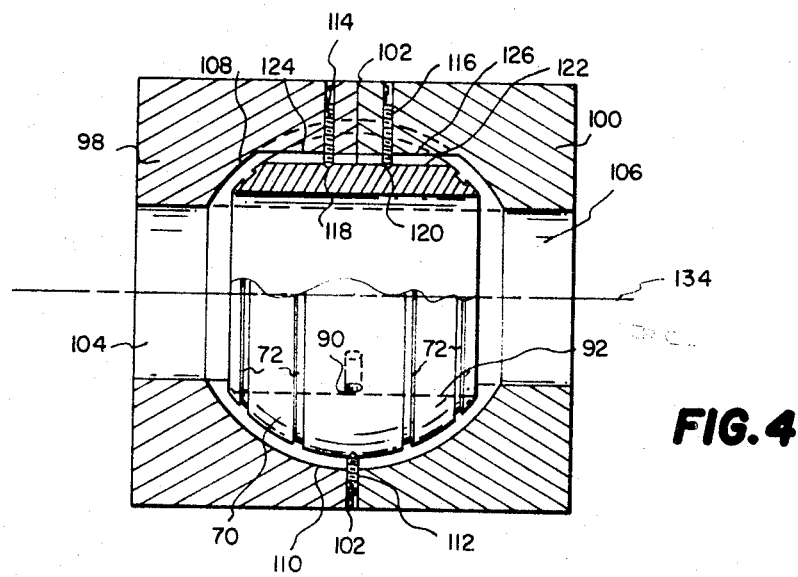
FIG. 4 is a sectional view of a die holding a valve member of the invention, in accordance with a method thereof for producing an abrasion and corrosion resistant valve member.

The ball valve member 58 is generally spherical in shape and provided with said covering 56 of rubber-like corrosion and abrasion resistant material, this cover is provided with a bore 64 adapted to align with corresponding bore portions 66 and 68 of the sleeves 44 and 46. The covering 56 being provided with spherical surfaces, as hereinbefore described, which are compressively and movably engageable with the spherical surfaces 52 and 54 of the sleeves 44 and 46. The ball valve member 58 is provided with metallic core 70 having dovetail grooves 72 in the periphery thereof. These grooves being adapted to provide an interlock for the covering 56 which is cast and cured on the core 70 of the valve member 58, as will be hereinafter described. These dovetail slots diverge inwardly, as shown in FIGS. 3 and 4 of the drawings, and hold the covering 56 in juxtaposition thereon.

A pivot pin 74 is screw threaded in the side wall of the housing 12 and is provided with a bearing point 76 pivotally engaging a corresponding socket in the core member 70 to provide a pivotal guide for the ball valve member 58 which is actuated by a handle or actuating means 78 externally of the housing member 12, this actuating member 78 engages a square in cross-section portion 80 of a shaft 82 which is provided with a cross bar 84 engaged in a slotted portion 86 of the ball valve member 58. This slotted portion 86 being provided with a portion of the covering 56 and the axis of the shaft 82 is aligned with the axis of the pin 76 and both axes are substantially at right angles to the axis of the bore 64 and the bore portions 66 and 68, hereinbefore described.

It will be seen that one of the conduits 38 and 40 may be the inlet for the valve and one of them may be the outlet for the valve, as desired.

As shown in FIG. 2 of the drawings, radially disposed holes 90 in the core member 70 are filled with material of said covering 56 to interconnect the covering on the periphery or spherical portion of the core 70 and the covering disposed inwardly of a bore portion 92 of the core 70.

Surrounding the shaft 82 is packing gland 93 compressively engaging packing rings 94. The packing gland being held to the housing section 12 by bolts 96.

As shown in FIG. 4, means is provided for practicing a method relating to the production of the ball valve member 58. The means shown in FIG. 4, comprises die members 98 and 100 separable about a center line 102 which intersects the core 70 in a plane corresponding to the shaft 82 and the pin 76, as hereinbefore described. The die member 98 is provided with a circular in cross-section bore portion 104 and the die member 100 is provided with a circular in cross-section bore portion 106. The diameters of the bore portions 104 and 106 are substantially less than the diameter of the bore 92 of the core 70 so as to provide for the casting of the covering material 56 internally of the bore 92 in order to provide for corrosion and abrasion resistant material internally of said bore 92.

The dies 98 and 100 are provided with internal concave spherical surface portions 108 and 110 which are adapted to mold the peripheral surfaces of the cover 56 which engages the concave spherical surfaces 52 and 54 of the sleeves 44 and 46, hereinbefore described.

These surfaces 108 and 110 are disposed on a substantially longer radius than the periphery of the core 70, consequently, the core 70 is held in the mold or dies 98 and 100 by means of a pin 112 similar to the pin 74, hereinbefore described, and another pair of pins 114 and 116 which engage sockets 118 and 120, respectively, in a notch portion 122 of the core member 70 in which the notch 86 is cast, as will be hereinafter described.

The dies 98 and 100 are provided with inwardly extending block portions 124 and 126 which correspond in width to the bar member 78 and these portions 124 and 126 are spaced from the walls of the notch 122 so that portions of the covering material 56 may be cast around the core member and internally of the notch 122 in order to provide for a complete U-shaped portion 130 of the covering material 56 in the notch 122, as shown best in FIG. 2 of the drawings.

The dies 98 and 100, when secured together, as shown in FIG. 4, and when holding the core 70 therein, may be placed in a lathe or any other suitable machine for rotating the dies about an axis 134 which passes coaxially through the bore 92. During rotation of the dies 98 and 100 with the core 70 therein, plastic material in fluid condition, may be introduced through the opening or bore 104 or 106, as desired, until the dies are completely filled in surrounding relation with the core member 70 and, such that the bore 92 of the core member 70 is lined with a layer of plastic material to form the bore 64 therein spaced internally of the bore 92, this being accomplished by reason of the fact that the bore portions 104 and 106 of the dies 98 and 100 are of smaller diameter than the bore 92.

During the process of centrifugal dispersion of the fluid plastic material in the dies 98 and 100, heat may be applied to the dies to cure the material.

It will be understood, that polyurethane or any other suitable corrosion and abrasion resistant material may be used and that this material, when cured, may be relatively soft as compared to the housing and core member 70 and may preferably be of a resilient rubber-like character.

Figure 5:
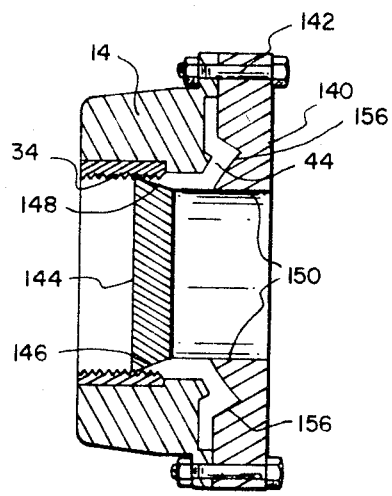
FIG. 5 is a sectional view of a die structure for producing corrosion and abrasion resistant sleeves for the valve construction of the invention.

As shown in FIG. 5 of the drawings, a die 140 is shown connected by bolts 142 to the housing end member 14 for casting the sleeve 44 of abrasion and corrosion resistant material, as hereinbefore described. A plug 144 is inserted in the internally disposed screw threads of the bushing 34, this plug is provided with a conical end portion 146, permitting the material to flow over the ends of the internal threads of the sleeve 44 so as to provide a portion 148 of each sleeve 44 and 46 which extends over the threads internally of the bushing 34, so as to permit the external threads of the conduits 38 and 40 to engage and thread into this portion 148, whereby the inlet and outlet portions of the valve structure of the invention are protected from corrosion and abrasion at the ends of the sleeves 34 and 36 in the housing end sections 14 and 16.

An opening 150 is provided centrally in the die 140 and which coincides radially with the internal bore portions of the sleeves 44 and 46, whereby rotation of the die 140, may be accompanied by the insertion of material in the opening 150 which permits the material to be dispelled centrifugally and into a cavity 156 in the mold 140 which corresponds with one side of the cross-sectional shape of the sleeves 44 and 45. It will be seen that the opening 150 permits excess material to be expelled from the die 140 in a position coinciding with the bore portions 158 of the sleeves 44 and 46.

The die 140 may be heated during the rotating thereof, in order to set the plastic material and cure the same while the sleeve structures 44 and 46 are being formed.

It will be obvious to those skilled in the art that various modifications of the present invention may be resorted to in a manner limited only by a just interpretation of the following means and method claims.

I claim:
1. In a valve construction the combination of: a hollow housing having inlet and outlet openings therein; a valve member rotatably mounted in said housing; said valve member having a bore therethrough, said bore having opposite open ends adapted to communicate with said inlet and outlet openings of said housing, said valve member having peripheral surfaces; abrasion and corrosion resistant material incapsulating and covering said valve member about said peripheral surfaces and the wall surfaces of said bore; and abrasion and corrosion resistant sleeves surrounding portions of said inlet and outlet openings and disposed sealingly to bear against said abrasion and corrosion resistant material on said valve member; said inlet and said outlet are each provided with internally screw threaded bore portions and said sleeves are provided with portions extending internally of said screw threaded bore portions and into position to be sealingly and threadably engaged by threads of nipples or conduits screw threadable into said internally screw threaded bore portions.

2. In a valve construction the combination of: a hollow housing having inlet and outlet openings therein; a valve member rotatably mounted in said housing; said valve member having a bore therethrough, said bore having opposite open ends adapted to communicate with said inlet and outlet openings of said housing, said valve member having peripheral surfaces; abrasion and corrosion resistant material incapsulating and covering said valve member about said peripheral surfaces and the wall surfaces of said bore; and abrasion and corrosion resistant sleeves surrounding portions of said inlet and outlet openings and disposed sealingly to bear against said abrasion and corrosion resistant material on said valve member; said inlet and outlet are axially aligned with each other, said valve member being generally spherical and rotatable in said housing about an operating axis generally disposed at right angles to the axis of said bore; said housing is composed of an intermediate generally cylindrical body section and a pair of angular ring-shaped end sections; bolts extending through said end sections and clamping them against opposite ends of said body section, said sleeves having radially extending flanges clamped between respective end sections and said body section; said inlet and said outlet are each provided with an internally screw threaded bore portion and said sleeves are provided with portions extending internally of said screw threaded bore portion and into position to be sealingly and threadably engaged by threads of nipples screw threadable into said internally screw threaded bore portion.

References Cited

UNITED STATES PATENTS

| | | | |
|---|---|---|---|
| 2,083,091 | 6/1937 | Rector | 285—355 |
| 2,407,552 | 9/1946 | Hoesel | 285—355 |
| 2,533,885 | 12/1950 | Hill | 285—355 XR |
| 2,801,133 | 7/1957 | Ridley | 51—11 XR |
| 3,073,336 | 1/1963 | Johnson | 137—375 |
| 3,284,046 | 11/1966 | Allenbaugh | 251—315 |
| 3,334,650 | 8/1967 | Lowrey et al. | 137—375 |

HENRY T. KLINKSIEK, *Primary Examiner.*

U.S. Cl. X.R.

51—11; 251—315